July 5, 1932.    L. O. FRENCH    1,866,300
INTERNAL COMBUSTION ENGINE
Filed Oct. 26, 1929
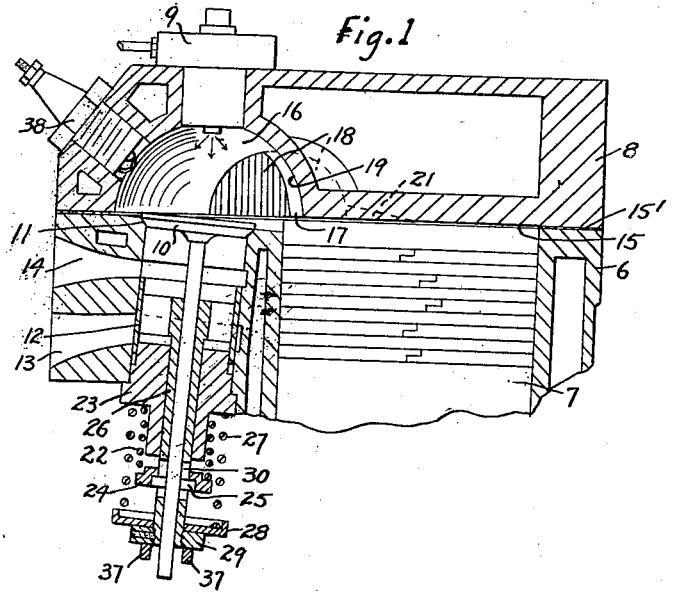
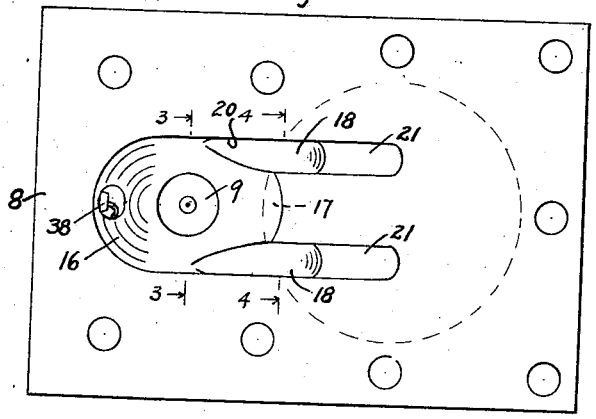
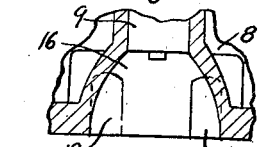
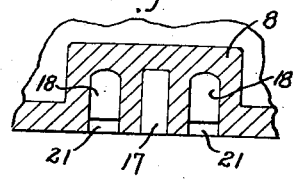
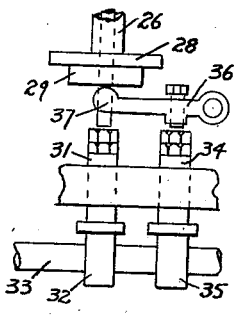
INVENTOR
Louis O. French Patented July 5, 1932

1,866,300

UNITED STATES PATENT OFFICE

LOUIS O. FRENCH, OF MILWAUKEE, WISCONSIN

INTERNAL COMBUSTION ENGINE

Application filed October 26, 1929. Serial No. 402,622.

The invention relates to internal combustion engines of the liquid fuel injection type.

In the injection of liquid fuel into internal combustion engines the directional movement of the jet or jets to secure a thorough mixing of the fuel with the air throughout the entire combustion chamber cannot be relied upon entirely, but to secure good combustion the air in the combustion chamber should be utilized to impart directional movement of the fuel and fuel mixture to secure proper distribution of the fuel throughout the air and also secure the equally important result of preventing the fuel depositing upon the walls of the combustion chamber. The object of this invention is to provide an internal combustion engine in which the relation of the piston, cylinder head, combustion chamber and fuel nozzle are such as to cause an efficient mixing of the fuel with the air during injection and the ensuing combustion process. More particularly, the invention embodies an internal combustion engine of the L-head four cycle type wherein the piston traverses the entire cylinder space except for a working clearance between the head and the top of the piston and a dome-shaped clearance space or chamber is formed at one side of the cylinder, restrictedly communicating with the cylinder space, a single valve-controlled port for both inlet and exhaust of gases opening into said clearance space and the fuel nozzle being located in the top of said dome-shaped space. The communication between the offset chamber and the cylinder space is restricted in the sense that its area is less than that of the cylinder bore, but it is preferably at least equal to that of the entrance and exit passage to said chamber when the valve is open and is preferably in the form of oppositely disposed ports in the head extending from the cylinder space into the dome-shaped chamber and entering said chamber at the sides thereof, said chamber also projecting at its inner end slightly over a part of the cylinder space. With this construction the fuel is discharged through one or more jets into the dome-shaped space which during this period has its walls subjected to the washing air current forced into said space along the sides and bottom of said chamber and to some extent along the top, thereby producing a violent, turbulent effect both during compression and combustion and preventing depositions of the fuel on the walls of the chamber. Furthermore, to more efficiently direct the gases passing to and from said chamber from and to the main part of the cylinder space, inclined channels in the head communicating with the main side ports may be employed.

The invention further consists in the several features hereinafter set forth and more particularly defined by claims at the conclusion thereof.

In the drawing Fig. 1 is a vertical, sectional view through an engine embodying the invention;

Fig. 2 is a bottom plan view of the cylinder head;

Fig. 3 is a detail, sectional view taken on the line 3—3 of Fig. 2;

Fig. 4 is a detail, sectional view taken on the line 4—4 of Fig. 2;

Fig. 5 is a detail, side elevation view of the valve-operating mechanism.

Referring to the drawing, the numeral 6 designates the cylinder, 7 the piston working therein, 8 the cylinder head, 9 the fuel injector, 10 the valve controlling the inlet and exhaust of gases through the single port 11, and 12 the piston slide valve associated with the valve 10 to control the inlet passage 13 and exhaust passage 14.

The cylinder, piston and head are so related that when the piston is at the end of its outward or upstroke the depth of the space 15 between the piston and head, over the greater portion of its area, is only such as to provide the necessary working clearance therebetween and this depth may be determined by the thickness of the cylinder head gasket 15′.

The valve 10 opens into an offset or laterally disposed, dome-shaped chamber 16 in communication with the cylinder space 15 through a throat or passage 17 and oppositely disposed passages 18. This chamber 16 is preferably formed as a recess in the head, having a generally elliptical base and conoidally or spherically curved walls, a part 19 of said wall projecting out over the cylinder space and cooperating with the cylinder to form the relatively narrow, centrally disposed throat 17. The passages 18 formed in the head extend from a position adjacent one side of the cylinder space into the chamber 16 at the sides 20 thereof, forming enlargements at these points, and the combined cross-sectional area of these passages is preferably at least equal to that of the port opening of the valve 10 so that the flow of gases to or from the cylinder space during suction and exhaust is not restricted, though the total cross-sectional area of the throat 17 and ports 18 is less than that of the cylinder bore and than that of the cross-sectional area of chamber 16 so that communication between the cylinder space and chamber 16 is therefore restricted. The head may also be recessed to provide the slightly upwardly inclined channels or passages 21, extending from the axis of the cylinder to the ports 18, to more readily direct the gases passing to and from the chamber 16 from and to the main part of the cylinder space.

The fuel injector 9 is mounted in the head at the top of the dome 16 and may be of any suitable construction, but is preferably an injector having a single jet of wide spraying angle directed generally downwardly or having several radially disposed jets directing the sprays downwardly and at an incline as denoted by the arrows in Fig. 1.

The valves 10 and 12 are not new per se but the association of the single valve 10 with the combustion chamber above described is novel and enables me to produce an L-head engine in which but a single opening into the combustion chamber is necessary, thereby permitting the fuel nozzle to be located in the best position for efficient fuel distribution and allowing the use of compression pressures suitable for autoignition either when starting from cold or after heating, and providing a relatively high combustion chamber to prevent the fuel coming into contact with the walls of said chamber.

As shown, the valve 10 is a simple poppet valve, normally seated by a spring 22 interposed between the cap 23 and a disk 24 operatively connected to the stem by a pin 25 extending therethrough. The piston valve 12 has a tubular stem 26 in which the stem of the valve 10 is guided and which itself is guided in a bore in the cap 23. This valve is normally held in one of its positions by a spring 27 interposed between the cap 23 and disk 28 secured in any suitable manner to its stem, as by a collar 29 having threaded engagement with said stem. The pin 25 works in a slot 30 in the stem 26 so that the valve may be moved independently. Any suitable valve mechanism may be used for operating the valves to open the valve 10 during the exhaust and suction strokes of the engine and move the valve 11 to uncover the exhaust port 14 during the exhaust stroke while closing the inlet port 13 and uncovering the inlet port during the suction stroke while closing the exhaust port. By way of illustration in Fig. 5 I have shown, somewhat diagrammatically, a mechanism for this purpose including a tappet 31 operated by a suitable cam 32 on the cam shaft 33 of the engine to control the valve 10 and a tappet 34 operated by a cam 35 on said shaft and acting on a tappet lever 36 suitably pivoted on the engine frame and having forked ends 37 straddling the stem of the valve 10 and engaging the collar 29. Either one of the ports controlled by the valve 12 may be the inlet and the other the outlet but it is preferred to use the lower port as an inlet port so that the entering air may act to cool the piston valve.

The bottom of the chamber 16 is shown slightly inclined and the port 11 inclining outwardly. This is not essential but it facilitates the formation of the jacket space around the valve mechanism and permits a reduction in the length of the chamber 16 that might otherwise be employed.

With the construction above described, during the upward movement of the piston 7 on the exhaust stroke the valve 10 is opening and the valve 12 is then in a position to allow the products of combustion to pass out through the exhaust port 14. As the piston starts over dead center the valve 12 shifts to uncover the inlet port 13 and cover the exhaust port and the valve 10 still being open the cylinder receives its charge of air during the ensuing downstroke of the piston. As the piston starts on its compression or next upstroke the valve 10 closes and the piston valve is moved down to uncover the exhaust port and cover the inlet port. As compression proceeds the gases in the cylinder space are forced through the throat 17 and passages 18 into the chamber 16 and set up a pronounced turbulence therein. Near the end of the compression stroke the fuel is sprayed into the chamber 16 under the requisite pressure and at this time the piston 7 is close to the head and in addition to the washing effect of the gas streams forced into the chamber through the passages 18 and 17 a thin stream of gas is forced across the bottom of the chamber 16. At the end of compression with the piston on upper dead center the greater portion of the compressed gases are in the chamber 16 and being mixed with the fuel and combustion is starting.

During the next down stroke combustion proceeds and the expanding gases issue from the chamber 16 into the cylinder space and drive the piston downwardly, after which the cycle is repeated. The injection of the fuel is preferably regulated so that combustion takes place on the so-called mixed cycle that is partly at constant volume and partly at constant pressure though for some purposes the combustion may be at predominately constant volume.

Ignition of the charge may be solely by the heat of compression or assisted on starting by a hot wire plug 38 or other suitable device, depending upon the compression pressures used.

I desire it to be understood that this invention is not to be limited to any particular form or arrangement of parts except insofar as such limitations are included in the claims.

What I claim as my invention is:

1. In an L-head internal combustion engine, the combination of a cylinder, a piston working in said cylinder, a dome-shaped combustion chamber offset from and in restricted communication with the end of the cylinder, said combustion chamber forming substantially the entire clearance space when the piston is at the end of its compression stroke, a single inlet and exhaust port communicating with said combustion chamber, a valve controlling said port, and a fuel injector mounted in the upper part of said dome-shaped chamber and discharging toward the lower portion thereof as the piston completes its compression stroke.

2. In an L-head internal combustion engine, the combination of a cylinder, a piston working in said cylinder, a dome-shaped combustion chamber offset and in restricted communication with the end of the cylinder but overlying a relatively narrow sector thereof, said combustion chamber forming substantially the entire clearance space when the piston is at the end of its compression stroke, a single inlet and exhaust port communicating with said combustion chamber, a valve controlling said port, and a fuel injector mounted substantially centrally in the top of said chamber and discharging toward the lower portion thereof as the piston completes its compression stroke.

3. In an L-head internal combustion engine, the combination of a cylinder, a piston working in said cylinder, a dome-shaped combustion chamber offset from the end of the cylinder and having laterally disposed passages extending into the end of the cylinder and providing a restricted communication between said chamber and the end of the cylinder, said combustion chamber forming substantially the entire clearance space when the piston is at the end of its compression stroke, a single inlet and exhaust port communicating with said combustion chamber, a valve controlling said port, and a fuel injector mounted in the top of said chamber and discharging toward the lower portion thereof.

4. In an L-head internal combustion engine, the combination of a cylinder, a piston working in said cylinder, a dome-shaped combustion chamber overlying a relatively narrow sector of the cylinder bore and having laterally disposed passages extending into the end of the cylinder, said combustion chamber forming substantially the entire clearance space when the piston is at the end of its compression stroke, a single inlet and exhaust port communicating with said combustion chamber, a valve controlling said port, the combined area of the passages to the end of the cylinder being at least equal to that of said single passage when said valve is fully open, and a fuel injector mounted in the top of said chamber and discharging toward the lower portion thereof.

5. In an L-head internal combustion engine, the combination of a cylinder, a piston working in said cylinder, a dome-shaped combustion chamber having spheroidally curved walls in restricted communication with the end of the cylinder but overlying a relatively narrow sector thereof, said combustion chamber forming substantially the entire clearance space when the piston is at the end of its compression stroke, a single inlet and exhaust port communicating with said combustion chamber, a valve controlling said port, and a fuel injector mounted in the top of said chamber and discharging toward the lower portion thereof.

6. In an L-head internal combustion engine, the combination of a cylinder, a piston working in said cylinder, a dome-shaped chamber offset from the end of the cylinder and having laterally disposed passages extending into the end of the cylinder and providing a restricted communication between said chamber and the end of the cylinder, there being grooves of reduced cross-section in the head leading from said laterally disposed passages out over the main part of the end of the cylinder, said combustion chamber forming substantially the entire clearance space when the piston is at the end of its compression stroke, a single inlet and exhaust port communicating with said chamber, a valve controlling said port, and a fuel injector mounted in the upper part of said chamber and discharging toward the lower portion thereof.

In testimony whereof, I affix my signature.

LOUIS O. FRENCH.